United States Patent
Six et al.

(10) Patent No.: US 8,627,933 B2
(45) Date of Patent: Jan. 14, 2014

(54) TWO STAGE VALVE AND HYDRAULIC DAMPED VALVE

(75) Inventors: Kristoff Six, Hasselt (BE); M'Hand Nait Oukhedou, Bree (BE); Ronny Vanbrabant, Heusden-Zolder (BE); Frank Gommans, Maastricht (NL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 381 days.

(21) Appl. No.: 12/791,036

(22) Filed: Jun. 1, 2010

(65) Prior Publication Data
US 2011/0290604 A1    Dec. 1, 2011

(51) Int. Cl.
*F16F 9/34* (2006.01)
(52) U.S. Cl.
USPC .................. 188/322.15; 188/322.14
(58) Field of Classification Search
USPC ........ 188/282.1, 282.5, 282.6, 282.8, 321.11, 188/322.13, 322.14, 322.15
See application file for complete search history.

(56) References Cited

U.S. PATENT DOCUMENTS

| | | | | |
|---|---|---|---|---|
| 4,953,671 A | * | 9/1990 | Imaizumi | 188/282.3 |
| 5,018,608 A | * | 5/1991 | Imaizumi | 188/322.15 |
| 5,133,434 A | * | 7/1992 | Kikushima et al. | 188/282.1 |
| 5,154,263 A | | 10/1992 | Lizell | |
| 5,738,190 A | * | 4/1998 | Deferme | 188/280 |
| 6,422,361 B2 | * | 7/2002 | Naples et al. | 188/322.15 |
| 7,040,468 B2 | * | 5/2006 | Shinata | 188/322.15 |
| 7,083,028 B2 | * | 8/2006 | Fujita et al. | 188/321.11 |
| 2009/0057079 A1 | | 3/2009 | Vanbrabant | |

FOREIGN PATENT DOCUMENTS

| | | | |
|---|---|---|---|
| EP | 1 906 048 A1 | 4/2008 | |
| JP | 03172638 A  * | 7/1991 | F16F 9/348 |
| KR | 10-0737-150 B1 | 7/2007 | |

OTHER PUBLICATIONS

Search Report and Written Opinion in corresponding PCT Application No. PCT/US2011/035728 dated Feb. 9, 2012.

* cited by examiner

*Primary Examiner* — Bradley King
*Assistant Examiner* — Stephen Bowes
(74) *Attorney, Agent, or Firm* — Harness, Dickey & Pierce, P.L.C.

(57) ABSTRACT

A shock absorber includes a two stage valve assembly that has two valve discs. The second valve disc defines the first stage at lower valve pressures and the first valve disc defines the second stage at higher valve pressures. The two valve discs can be defined by a single piece component or they can be separate components. The second valve disc can permit fluid flow by deflection of the second valve disc or by movement of the entire second valve disc. The two stage valve assembly can be incorporated into the piston assembly of the shock absorber and/or the two stage valve assembly can be incorporated into a base valve assembly.

15 Claims, 12 Drawing Sheets

TWO STAGE VALVE AND HYDRAULIC DAMPED VALVE

FIELD

The present disclosure relates to automotive shock absorbers. More particularly, the present disclosure relates to valve assemblies incorporated into the shock absorber which use two stage valving and/or hydraulically damped valving.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced in the piston by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction and these valves can be designed such that they generate a damping force also.

The valve assemblies for the shock absorber have the function of controlling oil flow between two chambers during the stroking of the shock absorber. By controlling the oil flow between the two chambers, a pressure drop is build up between the two chambers and this contributes to the damping forces of the shock absorber. The valve assemblies can be used to tune the damping forces to control ride and handling as well as noise, vibration and harshness.

SUMMARY

This section provides a general summary of the disclosure, and is not a comprehensive disclosure of its full scope or all of its features.

The present disclosure is directed to a shock absorber which includes one or more two stage valve assemblies for the shock absorber. The two stage valve assemblies are designed to combine the performance properties of a sliding valve assembly with the Noise, Vibration and Harshness (NVH) properties of a clamped valve assembly. In addition, the two stage valve of the present disclosure can incorporate hydraulic damping which controls the opening of the valve assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
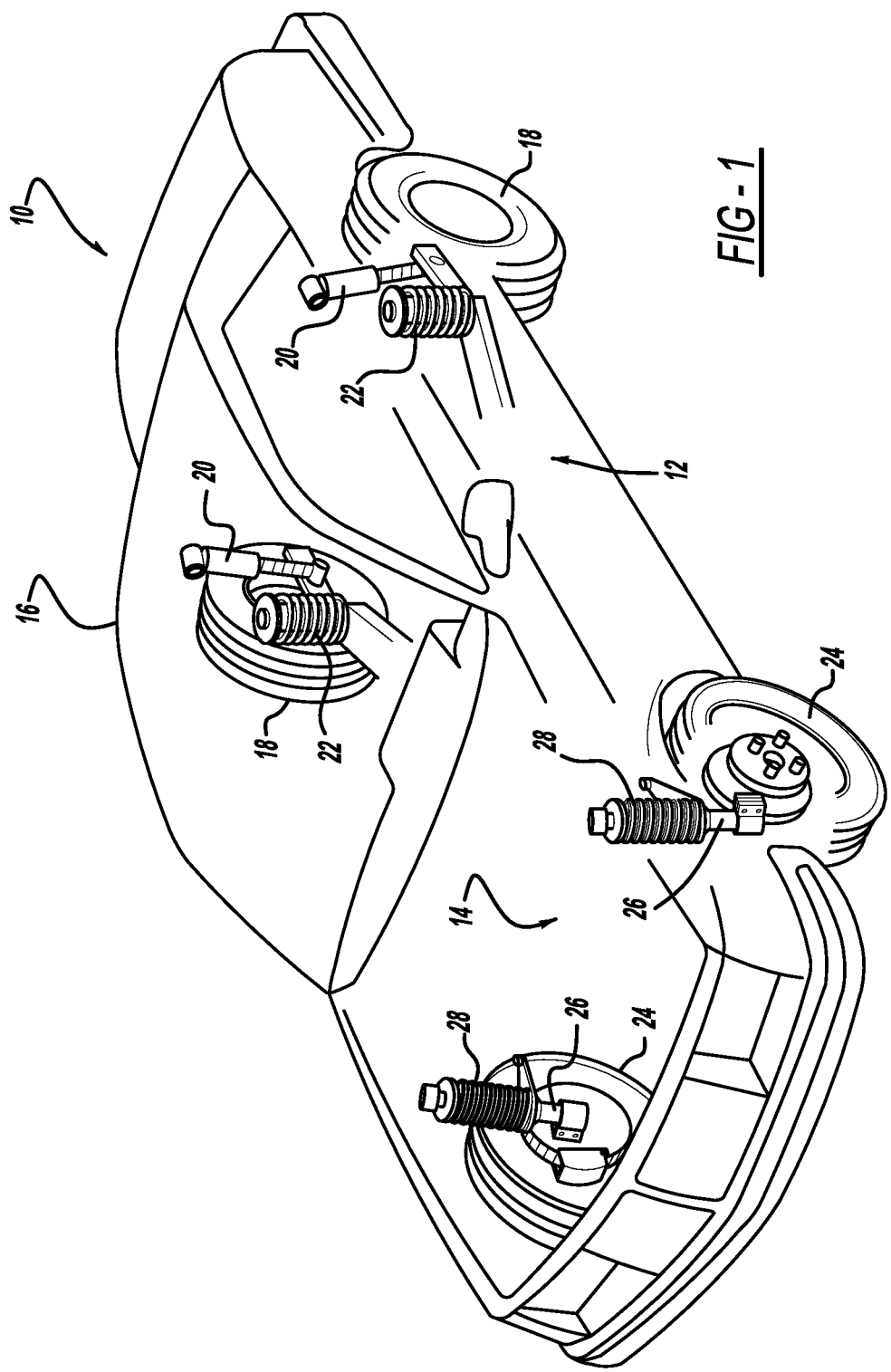
FIG. 1 is a schematic representation of a typical automobile which incorporates the two-stage valving in accordance with the present disclosure.

Referring now to the drawings in which like reference numerals designate like or corresponding parts throughout the several views, there is shown in FIG. 1 a vehicle which includes a suspension system incorporating the unique shock absorbers in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
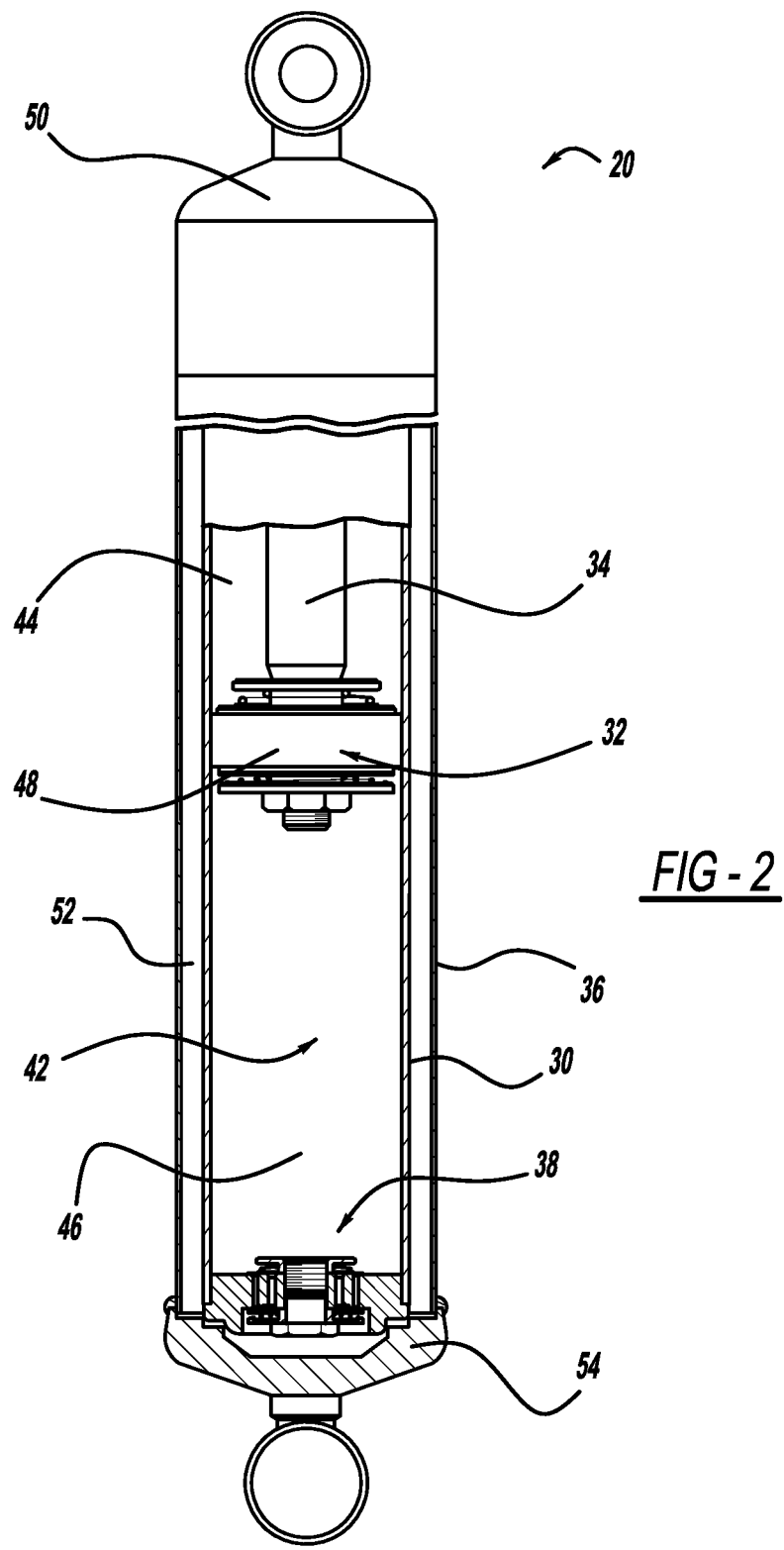
FIG. 2 is a side sectional view of the shock absorber in accordance with the present disclosure.

Referring now to FIG. 2, shock absorber 20 is shown in greater detail. While FIG. 2 illustrates only shock absorber 20, it is to be understood that shock absorber 26 also includes the unique valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod assembly 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod assembly 34 is attached to piston assembly 32 and extends through upper working chamber 44 and through an upper end cap 50 which closes the upper end of pressure tube 30. A sealing system seals the interface between upper end cap 50, reservoir tube 36 and piston rod assembly 34. The end of piston rod assembly 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod assembly 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
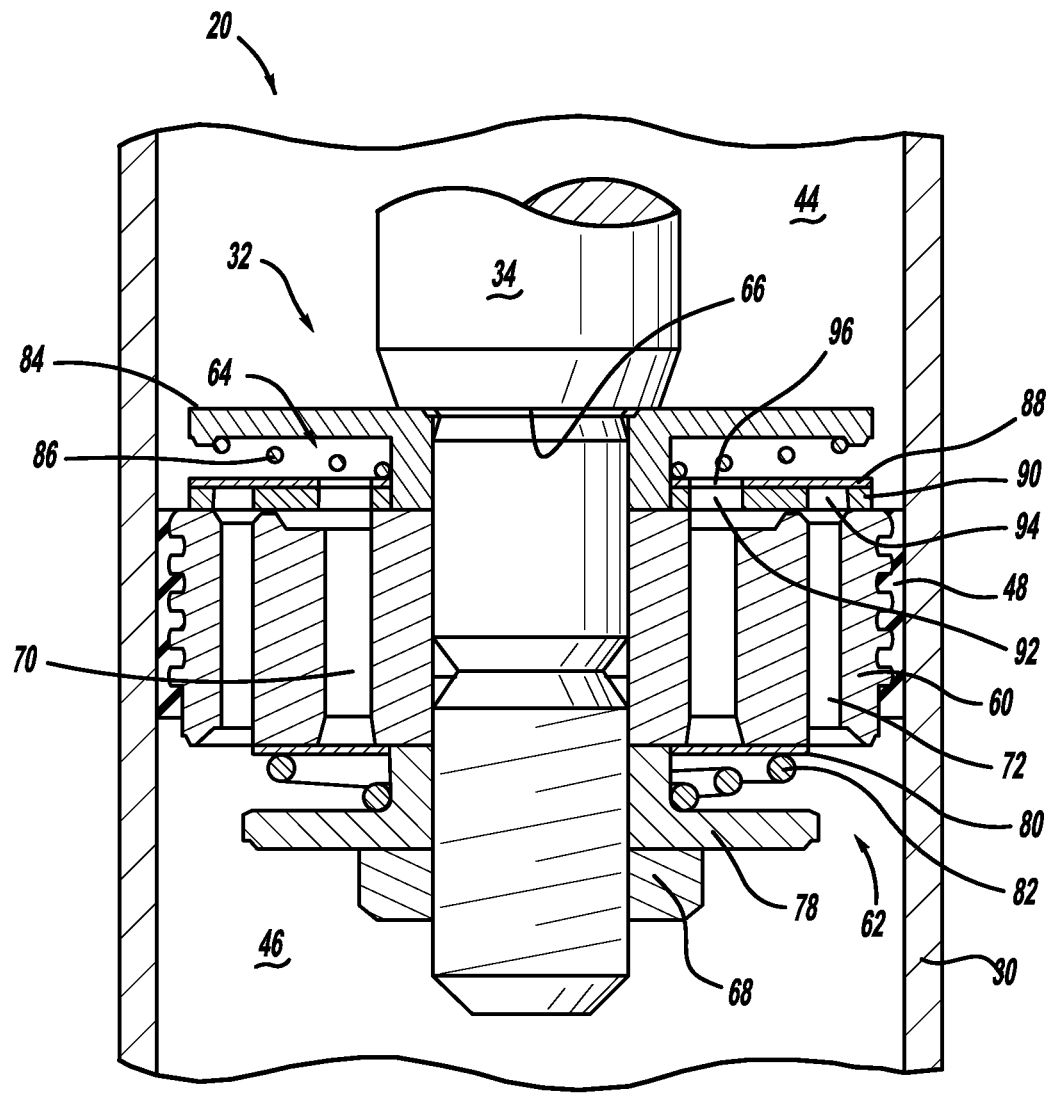
FIG. 3 is an enlarged cross-sectional view of the piston assembly in accordance with the present disclosure.

Referring now to FIG. 3, piston assembly 32 comprises a piston body 60, a rebound valve assembly 62 and a compression valve assembly 64. Compression valve assembly 64 is assembled against a shoulder 66 on piston rod assembly 34. Piston body 60 is assembled against compression valve assembly 64 and rebound valve assembly 62 is assembled against piston body 60. A retainer 68 secures these components to piston rod assembly 34.

Piston body 60 defines a plurality of rebound passages 70 and a plurality of compression passages 72. Seal 48 extends around piston body 60 to provide the seal between piston assembly 32 and pressure tube 30.

Rebound valve assembly 62 comprises a retainer 78, a valve disc 80 and a spring 82. Retainer 78 abuts retainer 68 on one end and piston body 60 on the opposite end. Valve disc 80 abuts piston body 60 and closes rebound passages 70 while leaving compression passages 72 open. Spring 82 is disposed between retainer 78 and valve disc 80 to bias valve disc 80 into engagement with piston body 60. During a rebound stroke of shock absorber 20 (extension in length), fluid in upper working chamber 44 is pressurized causing fluid pressure in upper working chamber 44 to react against valve disc 80. When the fluid pressure against valve disc 80 overcomes the biasing load of spring 82, valve disc 80 separates or disengages from piston body 60 by moving axially on retainer 78 to open rebound passages 70 and allow fluid flow from upper working chamber 44 to lower working chamber 46. The damping characteristics for shock absorber 20 during a rebound stroke are controlled by the strength of spring 82 and the size of rebound passages 70. During a compression stroke of shock absorber 20 (reduction in length), rebound passages 70 are closed by valve disc 80.

Compression valve assembly 64 comprises a backup washer 84, a spring 86, a clamped valve disc 88 and a sliding valve disc 90. Backup washer 84 abuts or engages piston body 60 and is slidably disposed on piston rod assembly 34. Backup washer 84 abuts shoulder 66 on piston rod assembly 34. Retainer 68 secures rebound valve assembly 62, piston body 60 and compression valve assembly 64 to piston rod assembly 34. A solid metal connection exists between shoulder 66 on piston rod assembly 34, backup washer 84, piston body 60, retainer 78 and retainer 68.

Sliding valve disc 90 is slidingly received on backup washer 84 and abuts or engages piston body 60 to close compression passages 72. A first plurality of through holes 92 extend completely through sliding valve disc 90 to open rebound passages 70. A second plurality of through holes 94 extend completely through sliding valve disc 90 to enable fluid communication between compression passages 72 and clamped valve disc 88 as discussed below. Clamped valve disc 88 is slidingly received on backup washer 84 and abuts or engages sliding valve disc 90 to close through holes 94. Clamped valve disc 88 includes a plurality of through holes 96 which extend completely through clamped valve disc 88 to allow fluid communication from upper working chamber 44, through through holes 96, through through holes 92 and into rebound passages 70. Spring 86 is disposed between backup washer 84 and clamped valve disc 88 to bias clamped valve disc 88 against sliding valve disc 90 and sliding valve disc 90 against piston body 60. Spring 86 engages the inside diameter of clamped valve disc 88 adjacent backup washer 84 and inside of through holes 92 to clamp clamped valve disc 88 against the inside diameter portion of sliding valve disc 90 to form a fulcrum point for the deflection of clamped valve disc 88.

During a compression stroke (reduction in length) of shock absorber 20, fluid in lower working chamber 46 is pressurized causing fluid pressure to react against clamped valve disc 88 and against sliding valve disc 90. The increase in fluid pressure will react against clamped valve disc 88 and when this fluid pressure reacting against clamped valve disc 88 overcomes the bending load for clamped valve disc 88, clamped valve disc 88 elastically deflects at the fulcrum point defined by spring 86 to separate from sliding valve disc 90 opening through holes 94 allowing fluid flow from lower working chamber 46 to upper working chamber 44 through compression passages 72 and through through holes 94. Spring 86 clamps the inside diameter of clamped valve disc 88 against sliding valve disc 90 during the deflection of clamped valve disc 88. The use of clamped valve disc 88 for the initial opening of compression passages 72 provides for a generally better NVH performance because of the gradual opening of compression valve assembly 64. As fluid pressure in lower working chamber 46 increases, the fluid pressure will react against sliding valve disc 90. When the fluid pressure reacting against sliding valve disc 90 overcomes the biasing load of spring 86, sliding valve disc 90 and clamped valve disc 88 will slide axially along backup washer 84 to a position spaced from piston body 60 to completely open compression passages 72. Thus, the present disclosure utilizes the NVH performance characteristics of a clamped valve designs at the initial opening of the valve and also utilizes the performance characteristics of the sliding valve design at higher velocities and increasing pressure drops while eliminating the performance limitations at increasing pressure drops at higher velocities of the clamped valve design and eliminating the NVH issues with the sliding valves which are caused by the sudden opening of the sliding valve design.

Figure 4:
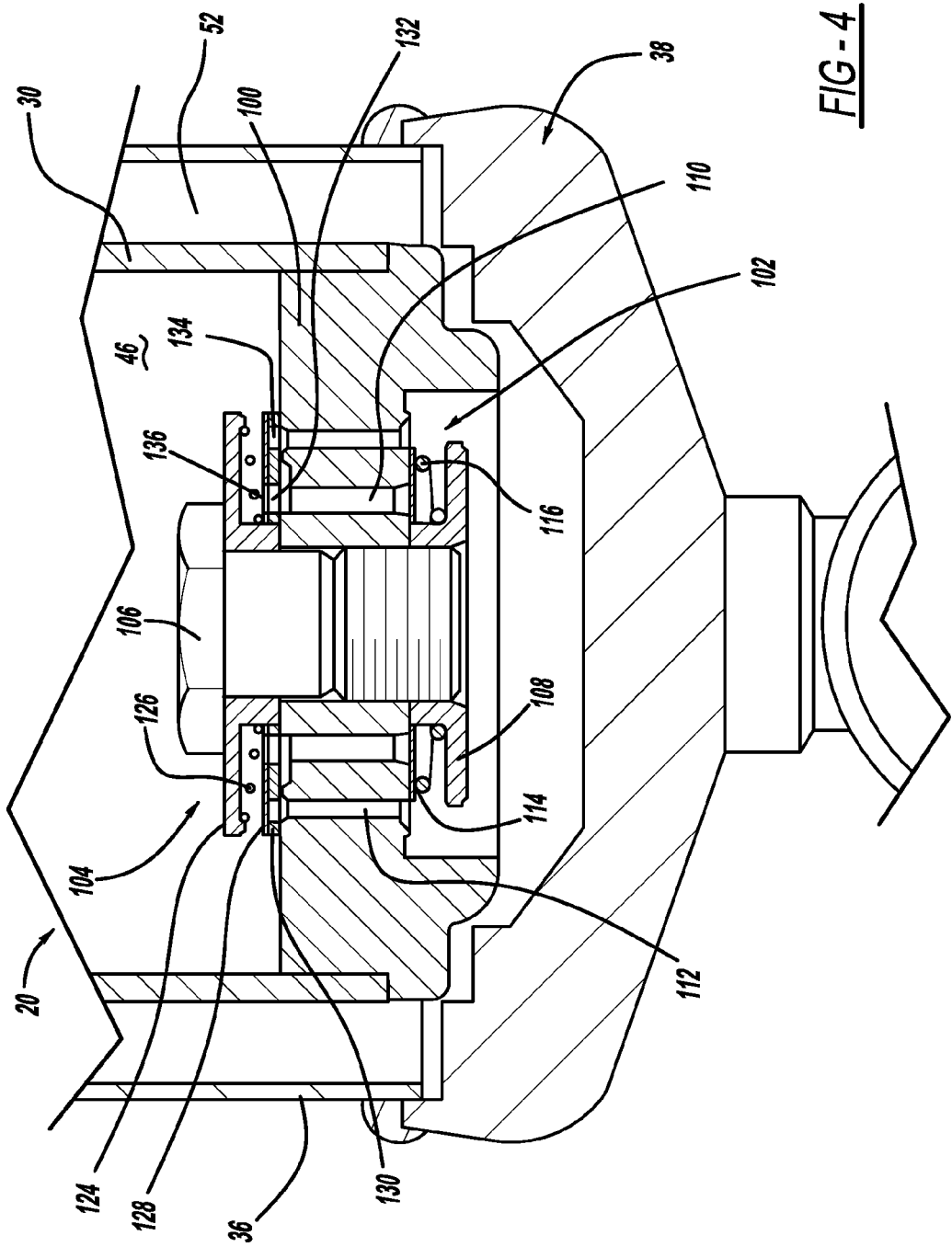
FIG. 4 is an enlarged cross-sectional view of the base valve assembly in accordance with the present disclosure.

Referring now to FIG. 4, base valve assembly 38 comprises a valve body 100, a compression valve assembly 102 and a rebound valve assembly 104. Rebound valve assembly 104 and compression valve assembly 102 are attached to valve body 100 using a bolt 106 and a retainer 108. Valve body 100 defines a plurality of compression passages 110 and a plurality of rebound passages 112. Compression valve assembly 102 is similar to rebound valve assembly 62 and rebound valve assembly 104 is similar to compression valve assembly 64.

Compression valve assembly 102 comprises retainer 108, a valve disc 114 and a spring 116. Retainer 108 abuts valve body 100. Valve disc 114 abuts valve body 100 and closes compression passages 110 while leaving rebound passages 112 open. Spring 116 is disposed between retainer 108 and valve disc 114 to bias valve disc 114 into engagement with valve body 100. During a compression stroke of shock absorber 20, fluid in lower working chamber 46 is increased in pressure causing fluid pressure in lower working chamber 46 to react against valve disc 114. When the fluid pressure against valve disc 114 overcomes the biasing load of spring 116, valve disc 114 separates or disengages from valve body 100 by moving axially on retainer 108 to open compression passages 110 and allow fluid flow from lower working chamber 46 to reservoir chamber 52. The damping characteristics for shock absorber 20 during a compression stroke are controlled by the strength of spring 116 and the size of compression passages 110. During a rebound stroke of shock absorber 20 (extension in length), compression passages 110 are closed by valve disc 114.

Rebound valve assembly 104 comprises a backup washer 124, a spring 126, a clamped valve disc 128 and a sliding valve disc 130. Backup washer 124 abuts or engages valve body 100 and is slidably disposed on bolt 106. Retainer 108 is illustrated as a nut which threadingly engages bolt 106 and retainer 108 abuts or engages valve body 100. Retainer 108 secures compression valve assembly 102, valve body 100 and rebound valve assembly 104. A solid metal connection exists between, retainer 108, valve body 100, backup washer 124 and bolt 106.

Sliding valve disc 130 is slidingly received on backup washer 124 and abuts or engages valve body 100 to close rebound passages 112. A first plurality of through holes 132 extend completely through sliding valve disc 130 to open compression passages 110. A second plurality of through holes 134 extend completely through sliding valve disc 130 to enable fluid communication between rebound passages 112 and clamped valve disc 128 as discussed below. Clamped valve disc 128 is slidingly received on backup washer 124 and abuts or engages sliding valve disc 130 to close through holes 134. Clamped valve disc 128 includes a plurality of through holes 136 which extend completely through clamped valve disc 128 to allow fluid communication from lower working chamber 46, through through holes 136, through through holes 132 and into compression passages 110. Spring 126 is disposed between backup washer 124 and clamped valve disc 128 to bias clamped valve disc 128 against sliding valve disc 130 and sliding valve disc 130 against valve body 100. Spring 126 engages the inside diameter of clamped valve disc 128 adjacent backup washer 124 and inside of through holes 132 to clamp clamped valve disc 128 against the inside diameter portion of sliding valve disc 130 to form a fulcrum point for the deflection of clamped valve disc 128.

During a rebound stroke (extension in length) of shock absorber 20, fluid in lower working chamber 46 is reduced in pressure causing fluid pressure from the fluid in reservoir chamber 52 to react against clamped valve disc 128 and against sliding valve disc 130. The increase in fluid pressure will react against clamped valve disc 128 and when this fluid pressure reacting against clamped valve disc 128 overcomes the bending load for clamped valve disc 128, clamped valve disc 128 elastically deflects at the fulcrum point defined by spring 126 to separate from sliding valve disc 130 opening through holes 134 allowing fluid flow from reservoir chamber 52 to lower working chamber 46 through rebound passages 112 and through through holes 134. Spring 126 clamps the inside diameter of clamped valve disc 128 against sliding valve disc 130 during the deflection of clamped valve disc 128. The use of clamped valve disc 128 for the initial opening of rebound passages 112 provides for a generally better NVH performance because of the gradual opening of rebound valve assembly 104. As fluid pressure in lower working chamber 46 continues to decrease, the fluid pressure from the fluid in reservoir chamber 52 will react against sliding valve disc 130. When the fluid pressure reacting against sliding valve disc 130 overcomes the biasing load of spring 126, sliding valve disc 130 and clamped valve disc 128 will slide axially along backup washer 124 to a position spaced from valve body 100 to completely open rebound passages 112. Thus, the present disclosure utilizes the NVH performance characteristics of a clamped valve designs at the initial opening of the valve and also utilizes the performance characteristics of the sliding valve design at higher velocities and increasing pressure drops while eliminating the performance limitations at increasing pressure drops at higher velocities of the clamped valve design and eliminating the NVH issues with the sliding valves which are caused by the sudden opening of the sliding valve design.

Figure 5:
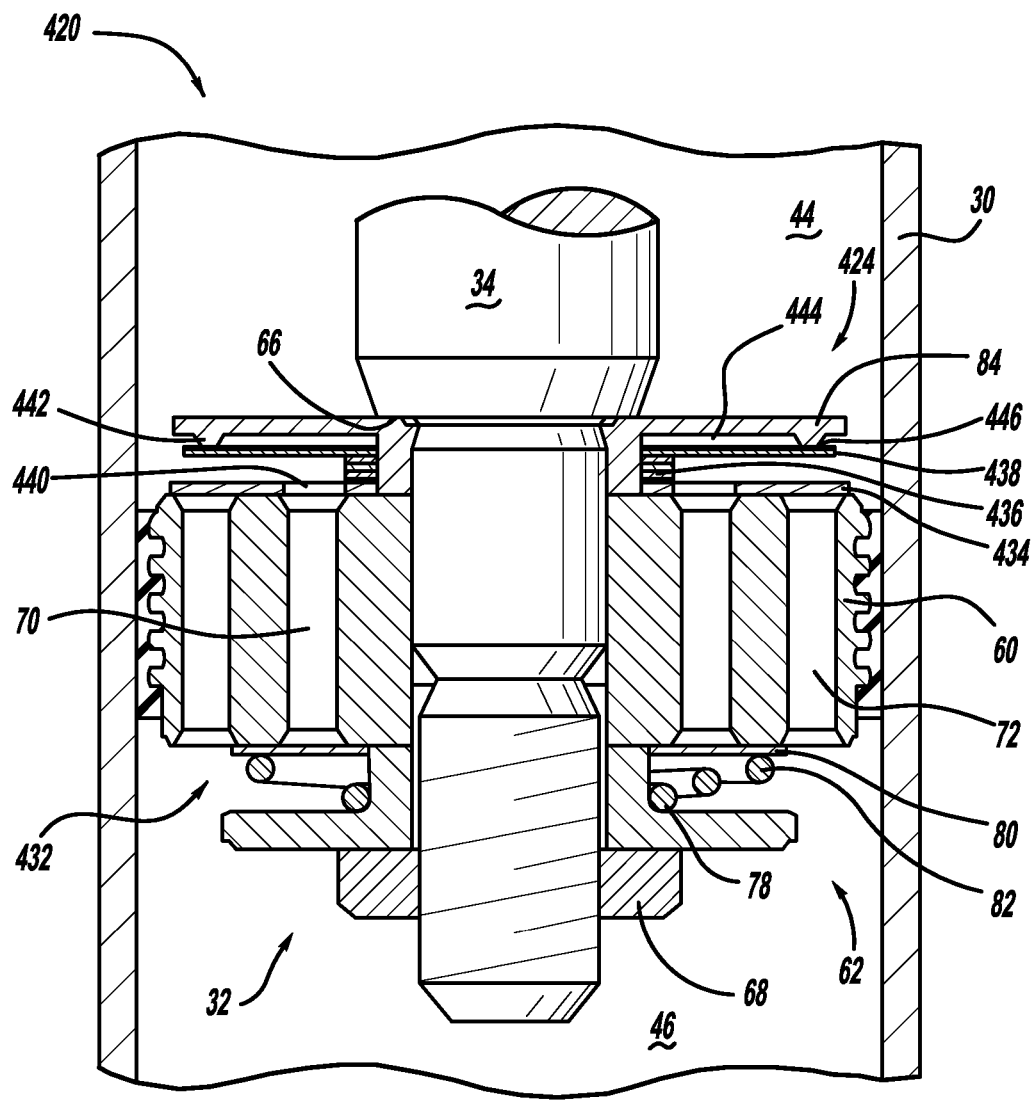
FIG. 5 is an enlarged cross-sectional view of a piston assembly in accordance with another embodiment of the present disclosure.
Figure 6:
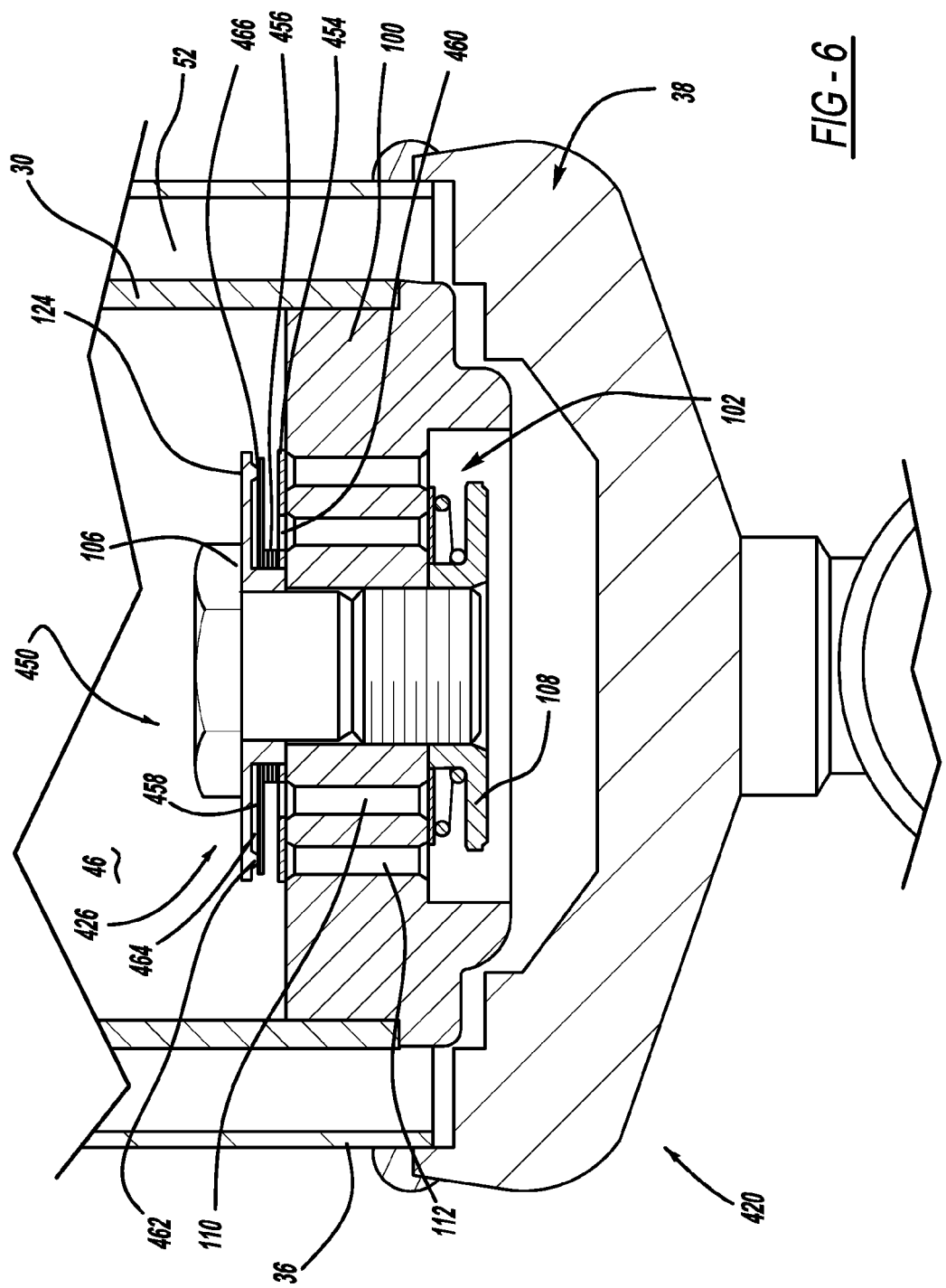
FIG. 6 is an enlarged cross-sectional view of a base valve assembly in accordance with the present disclosure.

Referring now to FIGS. 5-6, a portion of a shock absorber 420 in accordance with another embodiment of the present disclosure is illustrated. Shock absorber 420 can be a replacement for shock absorber 20 and/or shock absorber 26. Shock absorber 420 is the same as shock absorber 20 except that compression valve assembly 64 of piston assembly 32 has been replaced by compression valve assembly 424 and rebound valve assembly 104 of base valve assembly 38 has been replaced with rebound valve assembly 426.

A piston assembly 432 comprises piston body 60, rebound valve assembly 62 and compression valve assembly 424. Rebound valve assembly 62 is assembled against retainer 68 on piston rod assembly 34. Piston body 60 is assembled against rebound valve assembly 62 and compression valve assembly 424 is assembled against piston body 60 and shoulder 66. Retainer 68 secures these components to piston rod assembly 34.

Rebound valve assembly 62 is detailed above and therefore will not be repeated here. Compression valve assembly 424 comprises backup washer 84, a sliding valve disc 434, a plurality of transfer discs 436 and one or more preload discs 438. Backup washer 84 abuts or engages piston body 60 and shoulder 66 and is slidably disposed on piston rod assembly 34. Retainer 68 is illustrated as a nut which threadingly engages piston rod assembly 34. Retainer 68 secures rebound valve assembly 62, piston body 60 and compression valve assembly 424 to piston rod assembly 34. A solid metal connection exists between shoulder 66 on piston rod assembly 34, backup washer 84, piston body 60, retainer 78 and retainer 68.

Sliding valve disc 434 is slidingly received on backup washer 84 and abuts or engages piston body 60 to close compression passages 72. A plurality of through holes 440 extend completely through sliding valve disc 434 to open rebound passages 70. The plurality of transfer discs 436 abut or engage sliding valve disc 434 and the one or more preload discs 438 abut and engage both the plurality of transfer discs 436 at their inside diameter and a projection 442 formed on backup washer 84. The one or more preload discs 438 are flexed toward sliding valve disc 434 at their outside diameter to provide a preload for sliding valve disc 434 at the inside diameter of sliding valve disc 434. This preload extends through the plurality of transfer discs 436 to sliding valve disc 434. Backup washer 84 and the one or more preload discs 438 define a damping chamber 444 which operates to dampen the opening of sliding valve disc 434 as discussed below. The preload disc 438 which directly abuts projection 442 defines a controlled always open orifice 446 which allows fluid flow between damping chamber 444 and upper working chamber 44.

During a compression (reduction in length) of shock absorber 420, fluid in lower working chamber 46 is pressurized causing fluid pressure to react against sliding valve disc 434. The increase in fluid pressure will react against sliding valve disc 434 and when this fluid pressure reacting against sliding valve disc 434 overcomes the biasing load provided by the plurality of preload discs 438, sliding valve disc 434 and the plurality of transfer discs 436 will slide axially along backup washer 84 to a position spaced from piston body 60 to completely open compression passages 72. The axial movement of sliding valve disc 434 and the plurality of transfer discs 436 will be damped by damping chamber 444 because the volume of damping chamber 444 will be reduced by the axial movement of sliding valve disc 434, the plurality of transfer discs 436 and the subsequent movement of the inner diameter of the plurality of preload discs 438. This volume reduction forces the fluid in damping chamber 444 to flow through controlled orifice 446. This flow creates a pressure drop over controlled orifice 446 and this pressure drop creates a controlled, counteracting force on the movement of sliding valve disc 434 to dampen the axial movement. The amount of damping can be controlled by the area of the controlled orifice 446 and the area that covers damping chamber 444. The stiffness of compression valve assembly 424 can be controlled by the thickness and number of the plurality of preload discs 438. The preload on sliding valve disc 434 can be controlled by the thickness of the plurality of transfer discs 436 and the design for the plurality of preload discs 438.

Referring to FIG. 6, the lower portion of shock absorber 420 is illustrated and it includes a base valve assembly 450 which comprises valve body 100, compression valve assembly 102 and rebound valve assembly 426. Rebound valve assembly 426 is similar to compression valve assembly 424. Rebound valve assembly 426 and compression valve assembly 102 are attached to valve body 100 using bolt 106 and retainer 108. Valve body 100 defines the plurality of compression passages 110 and the plurality of rebound passages 112.

Compression valve assembly 102 is described above and the description will not be repeated here. Rebound valve assembly 426 comprises backup washer 124, a sliding valve disc 454, a plurality of transfer discs 456 and one or more preload discs 458. Backup washer 124 abuts or engages valve body 100 and is slidably disposed on bolt 106. Retainer 108 is illustrated as a nut which threadingly engages bolt 106. Retainer 108 secures compression valve assembly 102, valve body 100 and rebound valve assembly 426 to bolt 106. A solid metal connection exists between retainer 108, valve body 100, backup washer 124 and bolt 106.

Sliding valve disc 454 is slidingly received on backup washer 124 and abuts or engages valve body 100 to close rebound passages 112. A plurality of through holes 460 extend completely through sliding valve disc 454 to open compression passages 110. The plurality of transfer discs 456 abut or engage sliding valve disc 454 and the one or more preload discs 458 abut and engage both the plurality of transfer discs 456 at their inside diameter and a projection 462 formed on backup washer 124. The one or more preload discs 458 are flexed toward sliding valve disc 454 at their outside diameter to provide a preload for sliding valve disc 454 at the inside diameter of sliding valve disc 454. This preload extends through the plurality of transfer discs 456 to sliding valve disc 454. Backup washer 124 and the one or more preload discs 458 define a damping chamber 464 which operates to dampen the opening of sliding valve disc 454 as discussed below. The preload disc 458 which directly abuts projection 462 defines a controlled always open orifice 466 which allows fluid flow between damping chamber 464 and lower working chamber 46.

During a rebound stroke (extension in length) of shock absorber 420, fluid in lower working chamber 46 is reduced in pressure causing fluid pressure from reservoir chamber 52 to react against sliding valve disc 454. The increase in fluid pressure will react against sliding valve disc 454 and when this fluid pressure reacting against sliding valve disc 454 overcomes the biasing load provided by the plurality of preload discs 458, sliding valve disc 454 and the plurality of transfer discs 456 will slide axially along backup washer 124 to a position spaced from valve body 100 to completely open rebound passages 112. The axial movement of sliding valve disc 454 and the plurality of transfer discs 456 will be damped by damping chamber 464 because the volume of damping chamber 464 will be reduced by the axial movement of sliding valve disc 454, the plurality of transfer discs 456 and the subsequent movement of the inner diameter of the plurality of preload discs 458. This volume reduction forces the fluid in damping chamber 464 to flow through controlled orifice 466. This flow creates a pressure drop over controlled orifice 466 and this pressure drop creates a controlled, counteracting force on the movement of sliding valve disc 454 to dampen the axial movement. The amount of damping can be controlled by the area of the controlled orifice 466 and the area that covers damping chamber 464. The stiffness of rebound valve assembly 426 can be controlled by the thickness and number of the plurality of preload discs 458. The preload on sliding valve disc 454 can be controlled by the thickness of the plurality of transfer discs 456 and the design for the plurality of preload discs 458.

Figure 7:
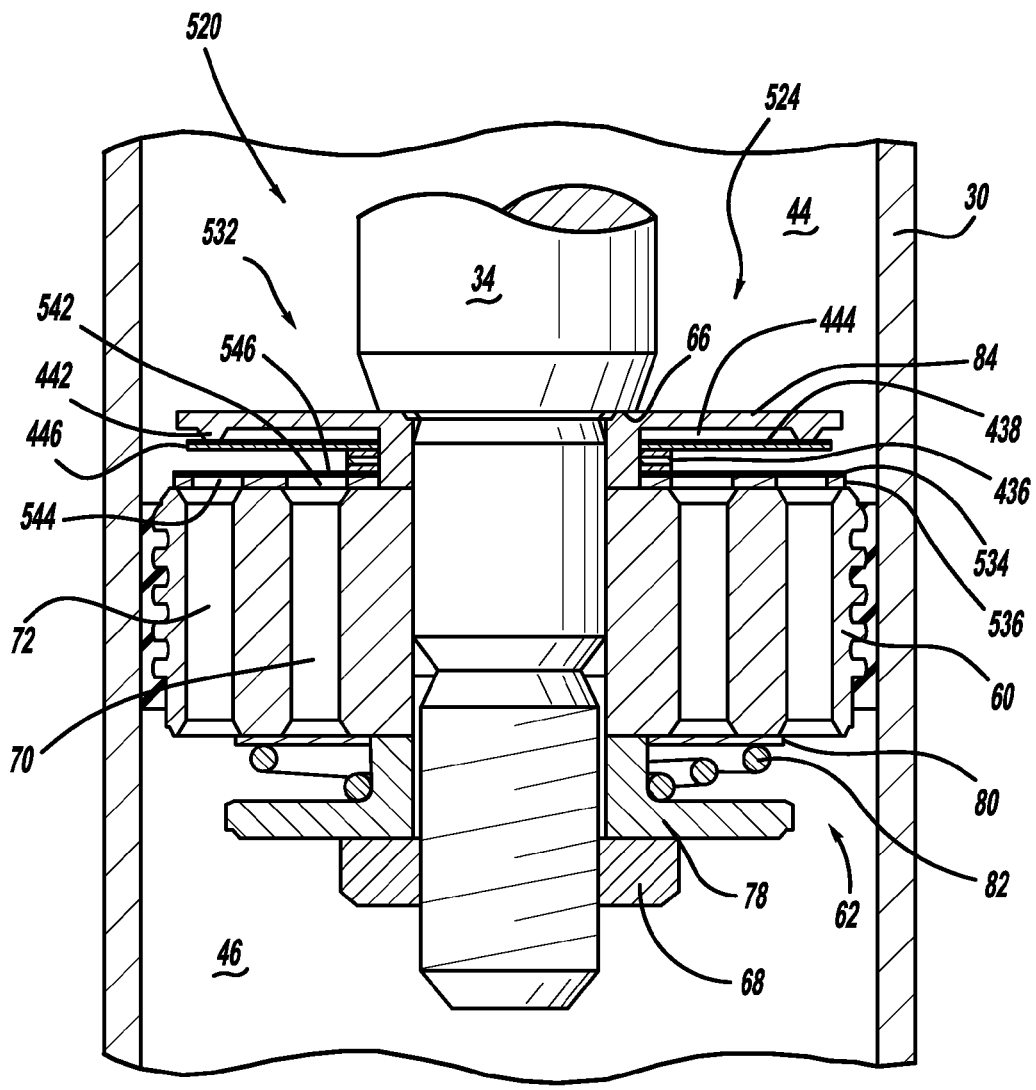
FIG. 7 is an enlarged cross-sectional view of a piston assembly in accordance with another embodiment of the present disclosure.
Figure 8:
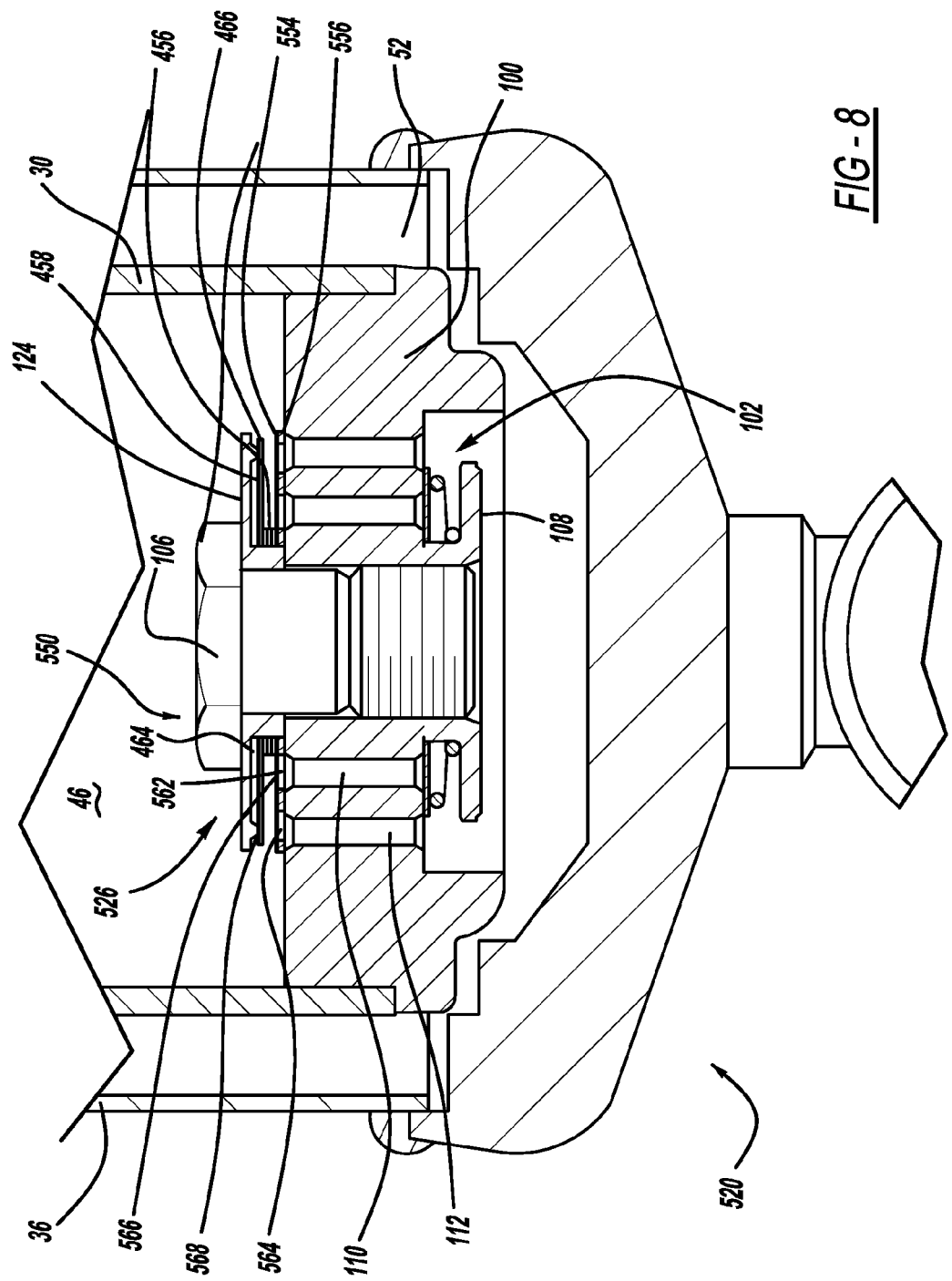
FIG. 8 is an enlarged cross-sectional view of a base valve assembly in accordance with the present disclosure.

Referring now to FIGS. 7-8, a portion of a shock absorber 520 in accordance with another embodiment of the present disclosure is illustrated. Shock absorber 520 can be a replacement for shock absorber 20 and/or shock absorber 26. Shock absorber 520 is the same as shock absorber 20 except that compression valve assembly 64 of piston assembly 32 has been replaced by compression valve assembly 524 and rebound valve assembly 104 of base valve assembly 38 has been replaced with rebound valve assembly 526.

A piston assembly 532 comprises piston body 60, rebound valve assembly 62 and compression valve assembly 524. Rebound valve assembly 62 is assembled against retainer 68 on piston rod assembly 34. Piston body 60 is assembled against rebound valve assembly 62 and compression valve assembly 524 is assembled against piston body 60 and shoulder 66. Retainer 68 secures these components to piston rod assembly 34.

Rebound valve assembly 62 is detailed above and therefore will not be repeated here. Compression valve assembly 524 comprises backup washer 84, a clamped valve disc 534, a sliding valve disc 536, the plurality of transfer discs 436 and the one or more preload discs 438. Backup washer 84 abuts or engages piston body 60 and shoulder 66 and is slidably disposed on piston rod assembly 34. Retainer 68 is illustrated as a nut which threadingly engages piston rod assembly 34. Retainer 68 secures rebound valve assembly 62, piston body 60 and compression valve assembly 524 to piston rod assembly 34. A solid metal connection exists between shoulder 66 on piston rod assembly 34, backup washer 84, piston body 60, retainer 78 and retainer 68.

Sliding valve disc 536 is slidingly received on backup washer 84 and abuts or engages piston body 60 to close compression passages 72. A first plurality of through holes 542 extend completely through sliding valve disc 536 to open rebound passages 70. A second plurality of through holes 544 extend completely through sliding valve disc 536 to enable fluid communication between compression passages 72 and clamped valve disc 534. Clamped valve disc 534 is slidingly received on backup washer 84 and abuts or engages sliding valve disc 536 to close through holes 544. Clamped valve disc 534 includes a plurality of through holes 546 which extend completely through clamped valve disc 534 to allow fluid communication from upper working chamber 44, through through holes 546, through through holes 542 and into rebound passages 70. The plurality of transfer discs 436 abut or engage clamped valve disc 534 and the one or more preload discs 438 abut and engage both the plurality of transfer discs 436 at their inside diameter and projection 442 formed on backup washer 84. The one or more preload discs 438 are flexed toward clamped valve disc 534 at their outside diameter to provide a preload for clamped valve disc 534 at the inside diameter of clamped valve disc 534 to form a fulcrum point for the deflection of clamped valve disc 534. This preload extends through the plurality of transfer discs 436 and through clamped valve disc 534 to urge sliding valve disc 536 against piston body 60. Backup washer 84 and the one or more preload discs 438 define damping chamber 444 which operates to dampen the opening of sliding valve disc 536 as discussed below. The preload disc 438 which directly abuts projection 442 defines the controlled always open orifice 446 which allows fluid flow between damping chamber 444 and upper working chamber 44.

During a compression (reduction in length) of shock absorber 520, fluid in lower working chamber 46 is pressurized causing fluid pressure to react against clamped valve disc 534 and sliding valve disc 536. The increase in fluid pressure will react against clamped valve disc 534 and when this fluid pressure reacting against clamped valve disc 534 overcomes the bending load for clamped valve disc 534, clamped valve disc 534 elastically deflects at the fulcrum point defined by transfer discs 436 to separate from sliding valve disc 536 opening compression passages 72 allowing fluid flow from lower working chamber 46 to upper working chamber 44 through compression passages 72. The plurality of preload discs 438 operating through transfer discs 436 clamp the inside diameter of clamped valve disc 534 against sliding valve disc 536 and sliding valve disc 536 against piston body 60. The initial use of clamped valve disc 534 for the initial opening of compression passages 72 provides for a generally better NVH performance because of the gradual opening of compression valve assembly 524. As fluid pressure in lower working chamber 46 increases, the fluid pressure reacting against sliding valve disc 536 increases. When the fluid pressure reacting against sliding valve disc 536 overcomes the biasing load provided by the plurality of preload discs 438, sliding valve disc 536, clamped valve disc 534 and the plurality of transfer discs 436 will slide axially along backup washer 84 to a position spaced from piston body 60 to completely open compression passages 72. The axial movement of sliding valve disc 536, clamped valve disc 534 and the plurality of transfer discs 436 will be damped by damping chamber 444 because the volume of damping chamber 444 will be reduced by the axial movement of sliding valve disc 536, clamped valve disc 534, the plurality of transfer discs 436 and the subsequent movement of the inner diameter of the plurality of preload discs 438. This volume reduction forces the fluid in damping chamber 444 to flow through controlled orifice 446. This flow creates a pressure drop over controlled orifice 446 and this pressure drop creates a controlled, counteracting force on the movement of sliding valve disc 536 to dampen the axial movement. The amount of damping can be controlled by the area of the controlled orifice 446 and the area that covers damping chamber 444. The stiffness of compression valve assembly 524 can be controlled by the thickness and number of the plurality of preload discs 438. The preload on clamped valve disc 534 can be controlled by the thickness of the plurality of transfer discs 436 and the design for the plurality of preload discs 438.

Thus, the present disclosure utilizes the NVH performance characteristics of a clamped valve designs at the initial opening of the valve and also utilizes the performance characteristics of the sliding valve design at higher velocities and increasing pressure drops while eliminating the performance limitations at increasing pressure drops at higher velocities of the clamped valve design and eliminating the NVH issues with the sliding valves which are caused by the sudden opening of the sliding valve design.

Referring to FIG. 8, the lower portion of shock absorber 520 is illustrated and it includes a base valve assembly 550 which comprises valve body 100, compression valve assembly 102 and rebound valve assembly 526. Rebound valve assembly 526 and compression valve assembly 102 are attached to valve body 100 using bolt 106 and retainer 108. Valve body 100 defines the plurality of compression passages 110 and the plurality of rebound passages 112.

Compression valve assembly 102 is described above and the description will not be repeated here. Rebound valve assembly 526 comprises backup washer 124, a clamped valve disc 554, a sliding valve disc 556, the plurality of transfer discs 456 and one or more preload discs 458. Backup washer 124 abuts or engages valve body 100 and is slidably disposed on bolt 106. Retainer 108 is illustrated as a nut which threadingly engages bolt 106. Retainer 108 secures compression valve assembly 102, valve body 100 and rebound valve assembly 526 to bolt 106. A solid metal connection exists between retainer 108, valve body 100, backup washer 124 and bolt 106.

Sliding valve disc 556 is slidingly received on backup washer 124 and abuts or engages valve body 100 to close rebound passages 112. A first plurality of through holes 562 extend completely through sliding valve disc 556 to open compression passages 110. A second plurality of through holes 564 extend completely through sliding valve disc 556 to enable fluid communication between rebound passages 112 and clamped valve disc 554. Clamped valve disc 554 is slidingly received on backup washer 84 and abuts or engages sliding valve disc 556 to close through holes 564. Clamped valve disc 554 includes a plurality of through holes 566 which extend completely through clamped valve disc 554 to allow fluid communication from lower working chamber 46, through through holes 566, through through holes 562 and into compression passages 110. The plurality of transfer discs 456 abut or engage clamped valve disc 554 and the one or more preload discs 458 abut and engage both the plurality of transfer discs 456 at their inside diameter and a projection 568 formed on backup washer 124. The one or more preload discs 458 are flexed toward clamped valve disc 554 at their outside diameter to provide a preload for clamped valve disc 554 at the inside diameter of clamped valve disc 554 to form a fulcrum point for the deflection of clamped valve disc 554. This preload extends through the plurality of transfer discs 456 and clamped valve disc 554 to bias sliding valve disc 556 against valve body 100. Backup washer 124 and the one or more preload discs 458 define damping chamber 464 which operates to dampen the opening of sliding valve disc 556 as discussed below. The preload disc 458 which directly abuts projection 462 defines controlled always open orifice 466 which allows fluid flow between damping chamber 464 and lower working chamber 46.

During a rebound (extension in length) of shock absorber 20, fluid in lower working chamber 46 reduces in pressure causing fluid pressure from reservoir chamber 52 to react against clamped valve disc 554 and sliding valve disc 556. The increase in fluid pressure will react against clamped valve disc 554 and when this fluid pressure reacting against clamped valve disc 554 overcomes the bending load for clamped valve disc 554, clamped valve disc 554 elastically deflects at the fulcrum point defined by transfer discs 456 to separate from sliding valve disc 556 opening rebound passages 112 allowing fluid flow from reservoir chamber 52 to lower working chamber 46 through rebound passages 112. The plurality of preload discs 458 operating through transfer discs 456 clamp the inside diameter of clamped valve disc 554 against sliding valve disc 556 and sliding valve disc 556 against valve body 100. The initial use of clamped valve disc 554 for the initial opening of rebound passages 112 provides for a generally better NVH performance because of the gradual opening of rebound valve assembly 526. As fluid pressure in lower working chamber 46 continues to decrease the fluid pressure from the fluid in reservoir chamber 52 reacting against sliding valve disc 556 increases. When the fluid pressure reacting against sliding valve disc 556 overcome the biasing load provided by the plurality of preload discs 458, sliding valve disc 556, clamped valve disc 554 and the plurality of transfer discs 456 will slide axially along backup washer 124 to a position spaced from valve body 100 to completely open rebound passages 112. The axial movement of sliding valve disc 556, clamped valve disc 554 and the plurality of transfer discs 456 will be damped by damping chamber 464 because the volume of damping chamber 464 will be reduced by the axial movement of sliding valve disc 556, clamped valve disc 554, the plurality of transfer discs 456 and the subsequent movement of the inner diameter of the plurality of preload discs 458. This volume reduction forces the fluid in damping chamber 464 to flow through controlled orifice 466. This flow creates a pressure drop over controlled orifice 466 and this pressure drop creates a controlled, counteracting force on the movement of sliding valve disc 556 to dampen the axial movement. The amount of damping can be controlled by the area of the controlled orifice 466 and the area that covers damping chamber 464. The stiffness of rebound valve assembly 526 can be controlled by the thickness and number of the plurality of preload discs 458. The preload on sliding valve disc 556 can be controlled by the thickness of the plurality of transfer discs 456 and the design for the plurality of preload discs 458.

Thus, the present disclosure utilizes the NVH performance characteristics of a clamped valve designs at the initial opening of the valve and also utilizes the performance characteristics of the sliding valve design at higher velocities and increasing pressure drops while eliminating the performance limitations at increasing pressure drops at higher velocities of the clamped valve design and eliminating the NVH issues with the sliding valves which are caused by the sudden opening of the sliding valve design.

Figure 9:
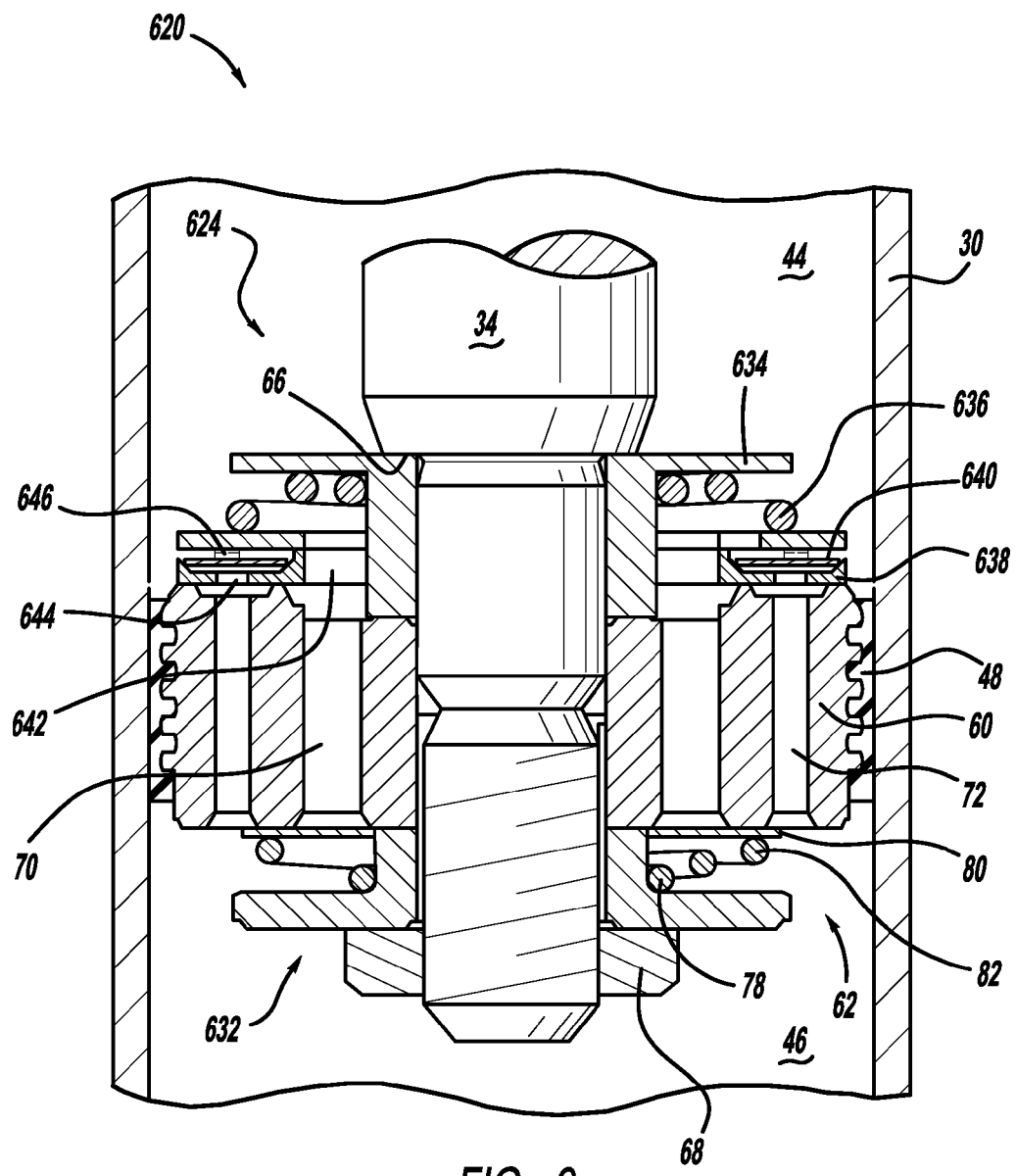
FIG. 9 is an enlarged cross-sectional view of a piston assembly in accordance with another embodiment of the present disclosure.
Figure 10:
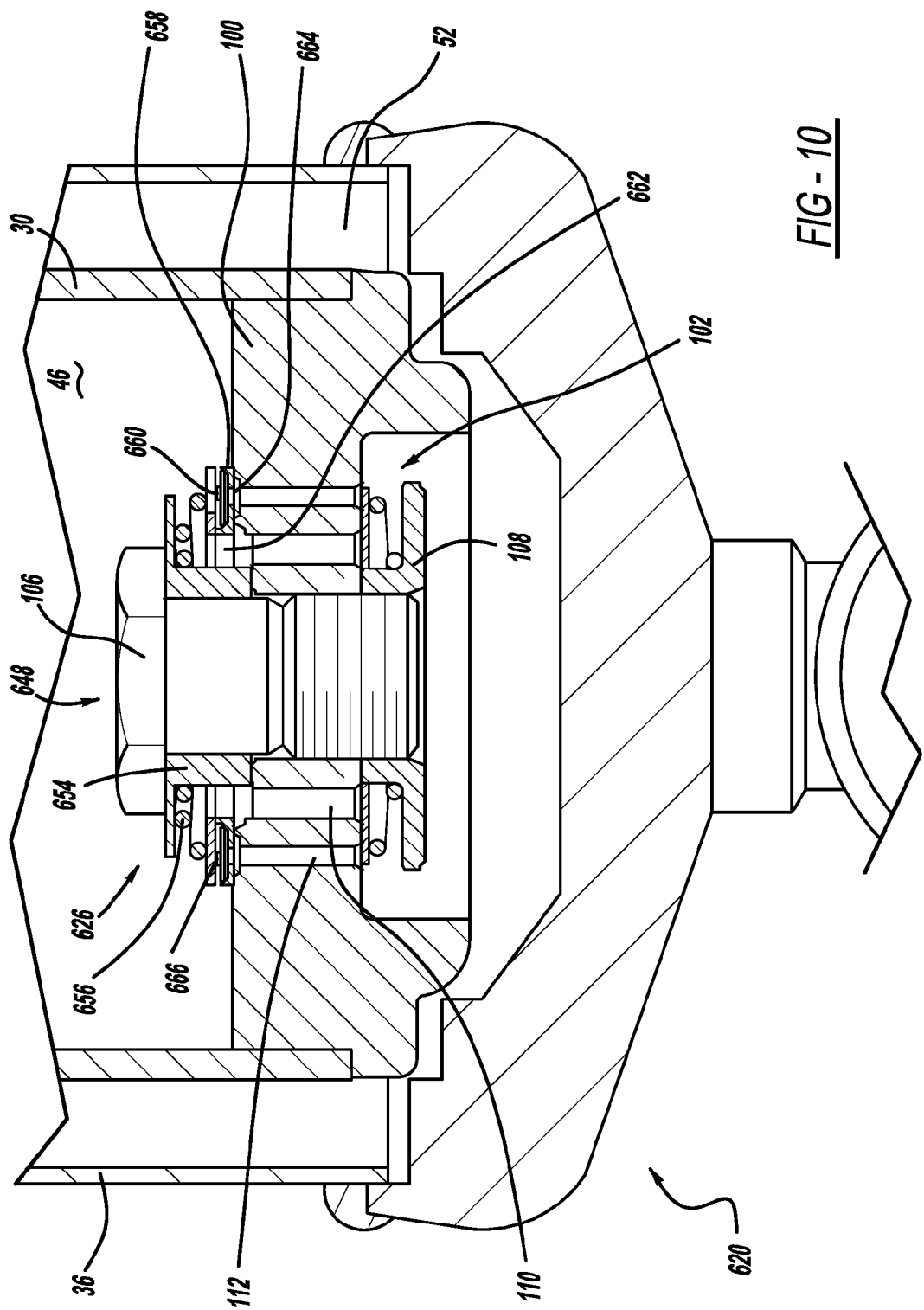
FIG. 10 is an enlarged cross-sectional view of a base valve assembly in accordance with the present disclosure.

Referring now to FIGS. 9-10, a portion of a shock absorber 620 in accordance with another embodiment of the present disclosure is illustrated. Shock absorber 620 can be a replacement for shock absorber 20 and/or shock absorber 26. Shock absorber 620 is the same as shock absorber 20 except that compression valve assembly 64 of piston assembly 32 has been replaced by compression valve assembly 624 and rebound valve assembly 104 of base valve assembly 38 has been replaced with rebound valve assembly 626.

Referring now to FIG. 9, a piston assembly 632 comprises piston body 60, rebound valve assembly 62 and compression valve assembly 624. Rebound valve assembly 62 is assembled against retainer 68 on piston rod assembly 34. Piston body 60 is assembled against rebound valve assembly 62 and compression valve assembly 624 is assembled against piston body 60 and shoulder 66. Retainer 68 secures these components to piston rod assembly 34.

Piston body 60 defines the plurality of rebound passages 70 and the plurality of compression passages 72. Seal 48 extends around piston body 60 to provide the seal between piston assembly 632 and pressure tube 30.

Rebound valve assembly 62 is described above and the description will not be repeated here. Compression valve assembly 624 comprises a backup washer 634, a spring 636, a first sliding valve disc 638 and a second sliding valve disc 640. Backup washer 634 abuts or engages piston body 60 and shoulder 66 and is slidably disposed on piston rod assembly 34. Retainer 68 is illustrated as a nut which threadingly engages piston rod assembly 34. Retainer 68 secures rebound valve assembly 62, piston body 60 and compression valve assembly 624 to piston rod assembly 34. A solid metal connection exists between shoulder 66 on piston rod assembly 34, backup washer 634, piston body 60, retainer 78 and retainer 68.

First sliding valve disc 638 is slidingly received on backup washer 634 and abuts or engages piston body 60 to close compression passages 72. A first plurality of through holes 642 extend completely through first sliding valve disc 638 to open rebound passages 70. A second plurality of through holes 644 extend completely through first sliding valve disc 638 to enable fluid communication between compression passages 72 and second sliding valve disc 640 as discussed below. Second sliding valve disc 640 is slidingly received on first sliding valve disc 638 and abuts or engages first sliding valve disc 638 to close through holes 644. Spring 636 is disposed between backup washer 634 and first sliding valve disc 638 to bias first sliding valve disc 638 against piston body 60.

During a compression stroke (reduction in length) of shock absorber 620, fluid in lower working chamber 46 is pressurized causing fluid pressure to react against second sliding valve disc 640 and against first sliding valve disc 638. The increase in fluid pressure will react against second sliding valve disc 640 and when this fluid pressure reacting against second sliding valve disc 640 overcomes the weight or load for second sliding valve disc 640, second sliding valve disc 640 moves axially to a position spaced from first sliding disc 638 opening through holes 644 allowing fluid flow from lower working chamber 46 to upper working chamber 44 through compression passages 72. In order to adjust the opening of second sliding valve disc 640, a biasing member 646 can be disposed between second sliding valve disc 640 and first sliding valve disc 638 as illustrated in dashed lines in FIG. 11. The use of low pressure second sliding valve disc 640 for the initial opening of compression passages 72 provides for a generally better NVH performance because of the gradual opening of compression valve assembly 624. As fluid pressure in lower working chamber 46 increases, the fluid pressure will react against first sliding valve disc 638. When the fluid pressure reacting against first sliding valve disc 638 overcomes the biasing load of spring 636, first sliding valve disc 638 and second sliding valve disc 640 will slide axially along backup washer 84 to a position spaced from piston body 60 to completely open compression passages 72. In this position, second sliding disc 640 will remain spaced from second sliding disc 638. Thus, the present disclosure utilizes the NVH performance characteristics of the second sliding valve design at the initial opening of the valve and also utilizes the performance characteristics of the first sliding valve design at higher velocities and increasing pressure drops while eliminating the performance limitations at increasing pressure drops at higher velocities of the clamped valve design and eliminating the NVH issues with the single sliding valves which are caused by the sudden opening of the single sliding valve design.

Referring now to FIG. 10, the lower portion of shock absorber 620 is illustrated and it includes base valve assembly 648 which comprises valve body 100, compression valve assembly 102 and rebound valve assembly 626. Rebound valve assembly 626 and compression valve assembly 102 are attached to valve body 100 using bolt 106 and retainer 108. Valve body 100 defines the plurality of compression passages 110 and the plurality of rebound passages 112.

Compression valve assembly 102 is described above and the description will not be repeated here. Rebound valve assembly 626 comprises a backup washer 654, a spring 656, a first sliding valve disc 658 and a second sliding valve disc 660. Backup washer 654 abuts or engages valve body 100 and is slidably disposed on bolt 106. Retainer 108 is illustrated as a nut which threadingly engages bolt 106. Retainer 108 secures compression valve assembly 102, valve body 100 and rebound valve assembly 626. A solid metal connection exists between, retainer 108, valve body 100, backup washer 654 and bolt 106.

First sliding valve disc 658 is slidingly received on backup washer 654 and abuts or engages valve body 100 to close rebound passages 112. A first plurality of through holes 662 extend completely through first sliding valve disc 658 to open compression passages 110. A second plurality of through holes 664 extend completely through first sliding valve disc 658 to enable fluid communication between rebound passages 112 and second sliding valve disc 660 as discussed below. Second sliding valve disc 660 is slidingly received on first sliding valve disc 658 and abuts or engages first sliding valve disc 658 to close through holes 664. Spring 656 is disposed between backup washer 654 and first sliding valve disc 658 to bias first sliding valve disc 658 against valve body 100.

During a rebound stroke (increase in length) of shock absorber 620, fluid in lower working chamber 46 is reduced in pressure causing fluid pressure from the fluid in reservoir chamber 52 to react against first sliding valve disc 658 and against second sliding valve disc 660. The increase in fluid pressure will react against second sliding valve disc 660 and when this fluid pressure from the fluid in reservoir chamber 52 reacting against second sliding valve disc 660 overcomes the weight or load for second sliding valve disc 660, second sliding valve disc 660 moves axially to a position spaced from first sliding disc 658 opening through holes 664 allowing fluid flow from reservoir chamber 52 to lower working chamber 46 through rebound passages 112. In order to adjust the opening of second sliding valve disc 660, a biasing member 666 can be disposed between first sliding valve disc 658 and second sliding valve disc 660 as illustrated in dashed lines in FIG. 12. The use of low pressure second sliding valve disc 660 for the initial opening of rebound passages 112 provides for a generally better NVH performance because of the gradual opening of rebound valve assembly 104. As fluid pressure in lower working chamber 46 continues to decrease, the fluid pressure from the fluid in reservoir chamber 52 will react against first sliding valve disc 658. When the fluid pressure reacting against first sliding valve disc 658 overcomes the biasing load of spring 656, first sliding valve disc 658 and second sliding valve disc 660 will slide axially along backup washer 654 to a position spaced from valve body 100 to completely open rebound passages 112. In this position, second sliding disc 660 will remain spaced from second sliding disc 658. Thus, the present disclosure utilizes the NVH performance characteristics of the second sliding valve design at the initial opening of the valve and also utilizes the performance characteristics of the first sliding valve design at higher velocities and increasing pressure drops while eliminating the performance limitations at increasing pressure drops at higher velocities of the clamped valve design and eliminating the NVH issues with the single sliding valves which are caused by the sudden opening of the single sliding valve design.

Figure 11:
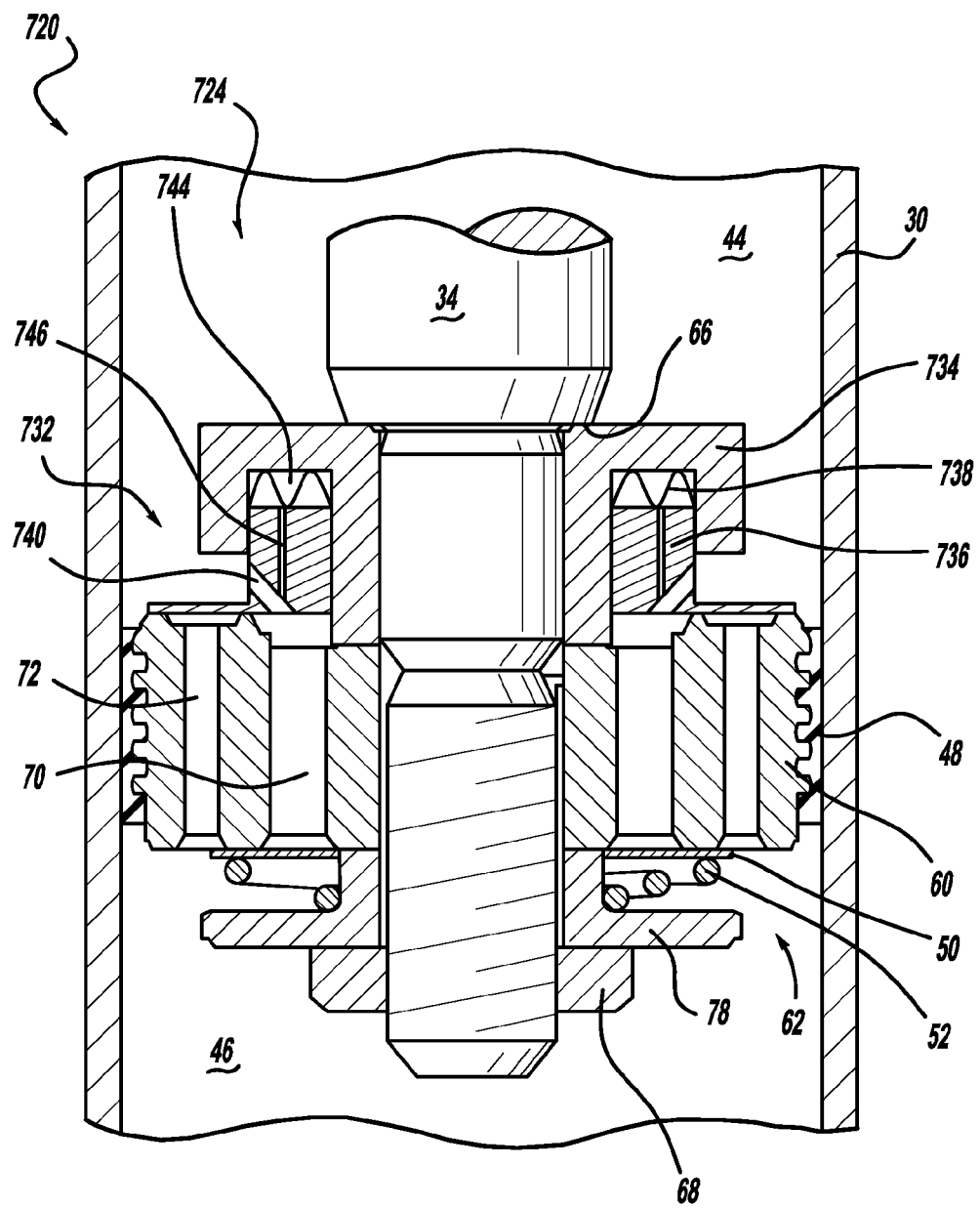
FIG. 11 is an enlarged cross-sectional view of a piston assembly in accordance with another embodiment of the present disclosure.
Figure 12:
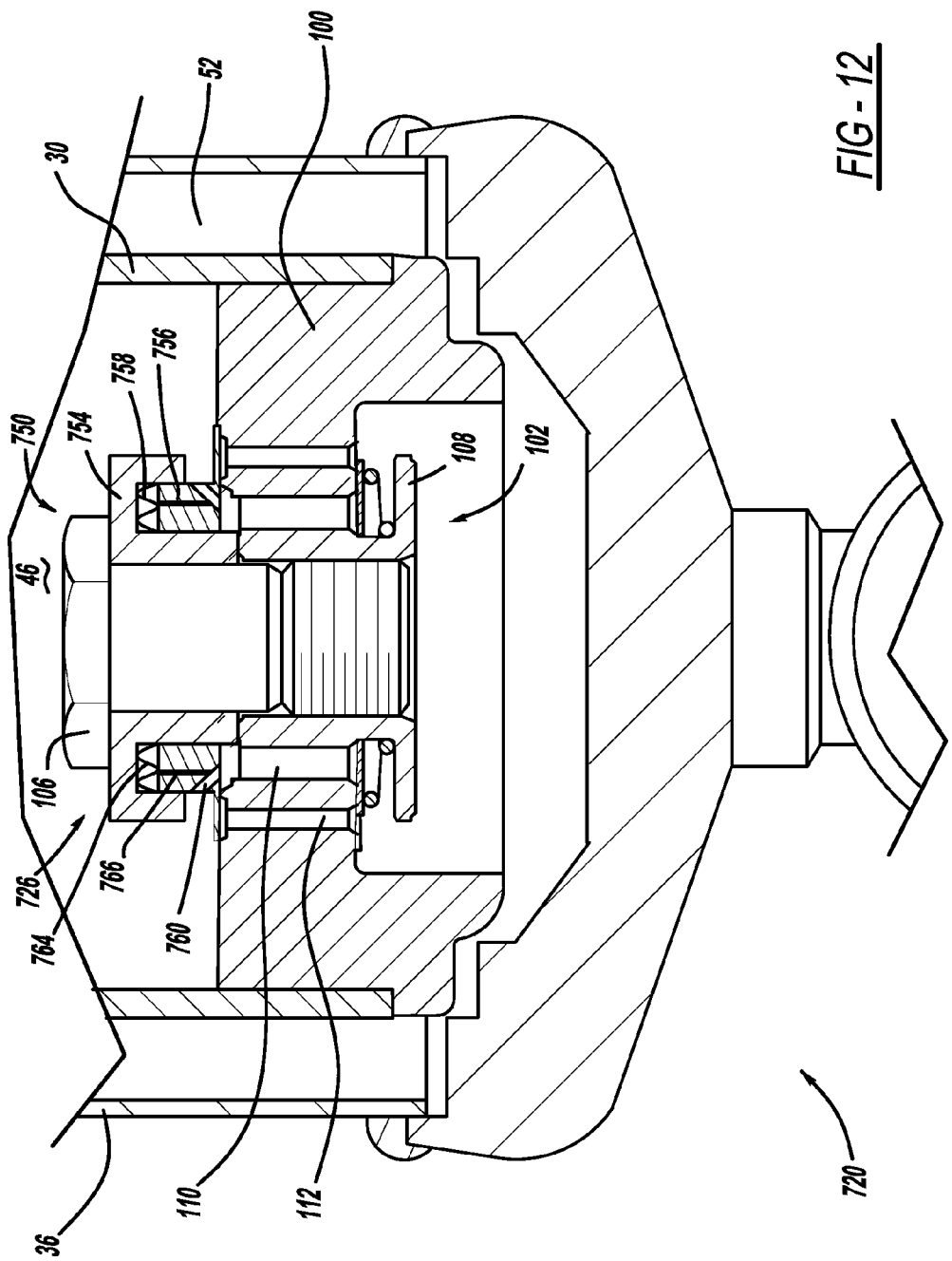
FIG. 12 is an enlarged cross-sectional view of a base valve assembly in accordance with the present disclosure.

Referring now to FIGS. 11-12, a portion of a shock absorber 720 in accordance with another embodiment of the present disclosure is illustrated. Shock absorber 720 can be a replacement for shock absorber 20 and/or shock absorber 26.

Shock absorber 720 is the same as shock absorber 20 except that compression valve assembly 64 of piston assembly 32 has been replaced by compression valve assembly 724 and rebound valve assembly 104 of base valve assembly 38 has been replaced with rebound valve assembly 726.

A piston assembly 732 comprises piston body 60, rebound valve assembly 62 and compression valve assembly 724. Rebound valve assembly 62 is assembled against retainer 68 on piston rod assembly 34. Piston body 60 is assembled against rebound valve assembly 62 and compression valve assembly 724 is assembled against piston body 60 and shoulder 66. Retainer 68 secures these components to piston rod assembly 34.

Rebound valve assembly 62 is detailed above and therefore will not be repeated here. Compression valve assembly 724 comprises a backup washer 734, a sliding valve disc 736 and a spring 738. Backup washer 734 abuts or engages piston body 60 and shoulder 66 and is slidably disposed on piston rod assembly 34. Retainer 68 is illustrated as a nut which threadingly engages piston rod assembly 34. Retainer 68 secures rebound valve assembly 62, piston body 60 and compression valve assembly 724 to piston rod assembly 34. A solid metal connection exists between shoulder 66 on piston rod assembly 34, backup washer 734, piston body 60, retainer 78 and retainer 68.

Sliding valve disc 736 is slidingly received on backup washer 734 and abuts or engages piston body 60 to close compression passages 72. A plurality of through holes 740 extend completely through sliding valve disc 736 to open rebound passages 70. Spring 738 provides a preload for sliding valve disc 736 at the inside diameter of sliding valve disc 736. Backup washer 734 and sliding valve disc 736 define a damping chamber 744 which operates to dampen the opening of sliding valve disc 736 as discussed below. A controlled always open orifice 746 which allows fluid flow between damping chamber 744 and upper working chamber 44 extends through sliding valve disc 736.

During a compression (reduction in length) of shock absorber 720, fluid in lower working chamber 46 is pressurized causing fluid pressure to react against sliding valve disc 736. The increase in fluid pressure will react against sliding valve disc 736 and when this fluid pressure reacting against sliding valve disc 736 overcomes the biasing load provided by spring 738, sliding valve disc 736 will slide axially along backup washer 734 to a position spaced from piston body 60 to completely open compression passages 72. The axial movement of sliding valve disc 736 will be damped by damping chamber 744 because the volume of damping chamber 744 will be reduced by the axial movement of sliding valve disc 736. This volume reduction forces the fluid in damping chamber 744 to flow through controlled orifice 746. This flow creates a pressure drop over controlled orifice 746 and this pressure drop creates a controlled, counteracting force on the movement of sliding valve disc 736 to dampen the axial movement. The amount of damping can be controlled by the area and/or number of the controlled orifice 746 and the area that covers damping chamber 744. The stiffness of compression valve assembly 724 can be controlled by the design of spring 738. The preload on sliding valve disc 736 can also be controlled by the design of spring 738.

Referring to FIG. 12, the lower portion of shock absorber 720 is illustrated and it includes a base valve assembly 750 which comprises valve body 100, compression valve assembly 102 and rebound valve assembly 726. Rebound valve assembly 726 and compression valve assembly 102 are attached to valve body 100 using bolt 106 and retainer 108. Valve body 100 defines the plurality of compression passages 110 and the plurality of rebound passages 112.

Compression valve assembly 102 is described above and the description will not be repeated here. Rebound valve assembly 726 comprises a backup washer 754, a sliding valve disc 756 and a spring 758. Backup washer 754 abuts or engages valve body 100 and is slidably disposed on bolt 106. Retainer 108 is illustrated as a nut which threadingly engages bolt 106. Retainer 108 secures compression valve assembly 102, valve body 100 and rebound valve assembly 726 to bolt 106. A solid metal connection exists between retainer 108, valve body 100, backup washer 754 and bolt 106.

Sliding valve disc 756 is slidingly received on backup washer 754 and abuts or engages valve body 100 to close rebound passages 112. A plurality of through holes 760 extend completely through sliding valve disc 756 to open compression passages 110. Spring 758 provides a preload for sliding valve disc 756 at the inside diameter of sliding valve disc 756. Backup washer 754 and sliding valve disc 756 define a damping chamber 764 which operates to dampen the opening of sliding valve disc 756 as discussed below. Sliding valve disc 756 defines a controlled always open orifice 766 which allows fluid flow between damping chamber 764 and reservoir chamber 52.

During a rebound (increase in length) of shock absorber 720, fluid in lower working chamber 46 is reduced in pressure causing fluid pressure from the fluid in reservoir chamber 52 to react against sliding valve disc 756. The increase in fluid pressure will react against sliding valve disc 756 and when this fluid pressure reacting against sliding valve disc 756 overcomes biasing load provided by spring 758, sliding valve disc 756 will slide axially along backup washer 754 to a position spaced from valve body 100 to completely open rebound passages 112. The axial movement of sliding valve disc 756 will be damped by damping chamber 764 because the volume of damping chamber 764 will be reduced by the axial movement of sliding valve disc 756. This volume reduction forces the fluid in damping chamber 764 to flow through controlled orifice 766. This flow creates a pressure drop over controlled orifice 766 and this pressure drop creates a controlled, counteracting force on the movement of sliding valve disc 756 to dampen the axial movement. The amount of damping can be controlled by the area and/or number of controlled orifice 766 and the area that covers damping chamber 764. The stiffness of rebound valve assembly 426 can be controlled by the design of spring 758. The preload on sliding valve disc 756 can be controlled by the design for spring 758.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A shock absorber comprising:
   a pressure tube forming a tube working chamber;
   a piston body slidably disposed within said working chamber, said piston body dividing said tube working chamber into an upper working chamber and a lower working chamber, said piston body defining a first plurality of fluid passages extending between said upper working chamber and said lower working chamber;

a first valve assembly attached to said piston body, said first valve assembly comprising:
  a first backup washer engaging said piston body, said first backup washer having a backup washer body and a projection projecting toward said piston body from said backup washer body;
  a first valve disc slidably disposed on said first backup washer, said first valve disc engaging said piston body;
  a second valve disc engaging said first valve disc, said second valve disc closing said first plurality of fluid passages;
  a preload disc slidably disposed on said first backup washer, said preload disc urging said second valve disc into engagement with said first valve disc, said preload disc directly engaging said projection defined by said first backup washer;
  a damping chamber defined by said preload disc and said backup washer body and said projection of first backup washer;
  a controlled orifice extending between said damping chamber and one of said upper and lower working chamber, said controlled orifice being defined by said preload disc and said projection of said backup washer, said controlled orifice controlling damping sliding movement of said preload disc along said first backup washer by controlling fluid flow through said controlled orifice; wherein
  said second valve disc is movable between a first position closing said first plurality of fluid passages and a second position where said second valve disc elastically deflects to separate from said first valve disc to open said first plurality of fluid passages; and
  said first valve disc is movable between a first position engaging said piston body and a second position spaced from said piston body to open said first plurality of fluid passages.

2. The shock absorber according to claim 1, wherein said second valve disc moves with said first valve disc when said first valve disc moves from said first position to said second position.

3. The shock absorber according to claim 1, wherein a single piece component defines said first valve disc and said second valve disc.

4. The shock absorber according to claim 1, wherein said second valve disc engages said first valve disc in said first position of said second valve disc and said second valve disc is spaced from said first valve disc in said second position of said second valve disc.

5. The shock absorber according to claim 1, further comprising:
  a transfer disc disposed between said preload disc and said first valve disc; wherein
  said preload disc biases said first valve disc into said first position.

6. The shock absorber according to claim 1, further comprising:
  a reservoir tube surrounding said pressure tube, a reservoir chamber being defined between said pressure tube and said reservoir tube;
  a valve body disposed between said tube working chamber and said reservoir chamber, said valve body defining a second plurality of fluid passages extending between said tube working chamber and said reservoir chamber;
  a second valve assembly attached to said valve body, said second valve assembly comprising:
    a second backup washer engaging said valve body;
    a third valve disc slidably disposed on said second backup washer, said third valve disc engaging said valve body;
    a fourth valve disc engaging said third valve disc, said fourth valve disc closing said first plurality of fluid passages; wherein
    said fourth valve disc is movable between a first position closing said second plurality of fluid passages and a second position opening said second plurality of fluid passages; and
    said third valve disc is movable between a first position engaging said valve body and a second position spaced from said valve body to open said second plurality of fluid passages.

7. The shock absorber according to claim 1, further comprising a biasing member disposed between said first backup washer and said second valve disc, said biasing member urging said second valve disc into engagement with said first valve disc.

8. The shock absorber according to claim 7, wherein said second valve disc slidably engages said backup washer and said biasing member engages said second valve disc at a position immediately adjacent said backup washer.

9. The shock absorber according to claim 1, further comprising:
  a preload disc slidably disposed on said first backup washer, said preload disc biasing said second valve disc into engagement with said first valve disc; and
  a transfer disc disposed between said preload disc and said second valve disc; wherein
  a damping chamber is disposed between said preload disc and said first backup washer; and
  a controlled orifice is defined between said damping chamber and said tube working chamber.

10. The shock absorber according to claim 1, wherein a damping chamber is defined between said first back-up washer and said first valve disc, a controlled orifice being defined between said damping chamber and said tube working chamber.

11. The shock absorber according to claim 1, further comprising a biasing member disposed between said first backup washer and said second valve disc, said biasing member urging said second valve disc into engagement with said first valve disc, said biasing member defining a fulcrum point for the deflection of said second valve disc.

12. The shock absorber according to claim 1, further comprising:
  a preload disc slidably disposed on said first backup washer, said preload disc biasing said second valve disc into engagement with said first valve disc; and
  a transfer disc disposed between said preload disc and said second valve disc; wherein
  a damping chamber is disposed between said preload disc and said first backup washer;
  a controlled orifice is defined between said damping chamber and said tube working chamber; and
  said transfer disc defining a fulcrum point for the deflection of said second valve disc.

13. The shock absorber according to claim 1, wherein the preload disc is parallel to said first valve disc when said first disc is in said first position.

14. The shock absorber according to claim 1, wherein said first valve disc defines at least one hole, said second valve disc fully closing said at least one hole.

15. The shock absorber according to claim 1, wherein fluid flow through said controlled orifice flows in a radial direction with respect to an axial centerline of said piston body between said damping chamber and said one of said upper and lower working chamber.

\* \* \* \* \*